United States Patent
Ogata et al.

(10) Patent No.: US 9,684,739 B1
(45) Date of Patent: Jun. 20, 2017

(54) VIEW GENERATOR FOR MANAGING DATA STORAGE

(75) Inventors: Scott Ogata, Lake Forest, CA (US); Jennifer Starling, Lake Forest, CA (US); Scott Auchmoody, Irvine, CA (US)

(73) Assignee: EMC IP HOLDING COMPANY LLC, Hopkinton, MA (US)

( * ) Notice: Subject to any disclaimer, the term of this patent is extended or adjusted under 35 U.S.C. 154(b) by 62 days.

(21) Appl. No.: 11/747,567

(22) Filed: May 11, 2007

Related U.S. Application Data

(60) Provisional application No. 60/747,040, filed on May 11, 2006.

(51) Int. Cl.
 *G06F 7/00* (2006.01)
 *G06F 17/30* (2006.01)

(52) U.S. Cl.
 CPC .............. *G06F 17/30979* (2013.01)

(58) Field of Classification Search
 CPC ......... G06F 17/30979; G06F 17/30292; G06F 17/30554; G06F 17/30516
 USPC ......... 707/683, 736, 737, E17.014; 709/223, 709/225, 229
 See application file for complete search history.

(56) References Cited

U.S. PATENT DOCUMENTS

| | | | |
|---|---|---|---|
| 5,542,064 A | 7/1996 | Tanaka et al. | |
| 5,642,505 A | 6/1997 | Fushimi | |
| 5,764,972 A | 6/1998 | Crouse et al. | |
| 6,212,512 B1 * | 4/2001 | Barney et al. | |
| 6,275,953 B1 | 8/2001 | Vahalia et al. | |
| 6,496,944 B1 * | 12/2002 | Hsiao et al. | 714/15 |
| 6,732,293 B1 | 5/2004 | Schneider | |
| 6,785,786 B1 * | 8/2004 | Gold | G06F 11/1461 711/162 |
| 6,795,966 B1 | 9/2004 | Lim et al. | |
| 6,829,617 B2 * | 12/2004 | Sawdon et al. | |
| 6,865,655 B1 | 3/2005 | Andersen | |

(Continued)

FOREIGN PATENT DOCUMENTS

| | | |
|---|---|---|
| CN | 200780009902 | 6/2010 |
| CN | 200780009902 | 5/2011 |

(Continued)

OTHER PUBLICATIONS

Sack, "SQL Server 2005 T-SQL Recipes a Problem-Solution Approach ", pp. 683-716, 2006.*

(Continued)

*Primary Examiner* — Md. I Uddin
(74) *Attorney, Agent, or Firm* — Workman Nydegger

(57) ABSTRACT

Views of files in an archival data storage system are generated by a backup view generator. A storage application generates and stores archival data in an archive system, the archival data corresponding to client data stored on a server or in memory associated with one or more client nodes. The storage application also generates backup files of the archival data which may be stored in a local memory. A set of metadata attributes are associated with each of the backup files. The backup views are generated by comparing metadata values in a view definition file to the sets of attributes associated with the backup files. Generated backup views can be exported for processing, including searching the backup views or displaying the backup views in a user interface.

20 Claims, 2 Drawing Sheets

(56) References Cited

U.S. PATENT DOCUMENTS

| | | | |
|---|---|---|---|
| 6,938,180 B1* | 8/2005 | Dysert | G06F 11/1448 |
| | | | 711/162 |
| 6,948,039 B2* | 9/2005 | Biessener et al. | 711/162 |
| 7,003,641 B2* | 2/2006 | Prahlad | G06F 17/30221 |
| | | | 707/999.202 |
| 7,093,086 B1 | 8/2006 | van Rietschote | |
| 7,096,316 B1 | 8/2006 | Karr et al. | |
| 7,149,858 B1 | 12/2006 | Kiselev | |
| 7,277,905 B2* | 10/2007 | Randal et al. | 707/204 |
| 7,343,459 B2 | 3/2008 | Prahlad et al. | |
| 7,346,263 B2 | 3/2008 | Honda | |
| 7,346,623 B2 | 3/2008 | Prahlad et al. | |
| 7,437,506 B1 | 10/2008 | Kumar et al. | |
| 7,447,692 B2* | 11/2008 | Oshinsky | G06F 17/30106 |
| 7,469,323 B1 | 12/2008 | Tormasov et al. | |
| 7,472,242 B1 | 12/2008 | Deshmukh et al. | |
| 7,500,001 B2 | 3/2009 | Tameshige et al. | |
| 7,669,020 B1 | 2/2010 | Shah et al. | |
| 7,761,456 B1* | 7/2010 | Cram et al. | 707/754 |
| 2002/0069335 A1 | 6/2002 | Flynn, Jr. | |
| 2002/0069369 A1 | 6/2002 | Tremain | |
| 2003/0177324 A1 | 9/2003 | Timpanaro-Perrotta | |
| 2003/0217038 A1 | 11/2003 | Kageyama et al. | |
| 2004/0172509 A1 | 9/2004 | Takeda et al. | |
| 2004/0225659 A1 | 11/2004 | O'Brien et al. | |
| 2005/0125513 A1 | 6/2005 | Sin-Ling Lam et al. | |
| 2005/0160243 A1 | 7/2005 | Lubbers et al. | |
| 2005/0235288 A1 | 10/2005 | Yamakabe et al. | |
| 2006/0053333 A1* | 3/2006 | Uhlmann et al. | 714/2 |
| 2006/0059207 A1 | 3/2006 | Hirsch et al. | |
| 2006/0184937 A1 | 8/2006 | Abels et al. | |
| 2007/0174566 A1 | 7/2007 | Kaneda et al. | |
| 2007/0179999 A1 | 8/2007 | Kamei et al. | |
| 2007/0180509 A1 | 8/2007 | Swartz et al. | |
| 2007/0286575 A1 | 12/2007 | Oashi et al. | |
| 2008/0013365 A1 | 1/2008 | Yueh | |
| 2008/0215474 A1 | 9/2008 | Graham | |
| 2008/0215796 A1 | 9/2008 | Lam et al. | |
| 2008/0313371 A1 | 12/2008 | Kedem et al. | |
| 2009/0222496 A1 | 9/2009 | Liu et al. | |
| 2009/0276771 A1 | 11/2009 | Nickolov et al. | |
| 2010/0275058 A1 | 10/2010 | Hashimoto et al. | |

FOREIGN PATENT DOCUMENTS

| | | |
|---|---|---|
| CN | 200780009902 | 9/2011 |
| CN | 200780016805.3 | 4/2012 |
| CN | 201210422261.3 | 3/2015 |
| EP | 0774715 | 5/1997 |
| EP | 0899662 A1 | 3/1999 |
| EP | 07758941.4 | 6/2009 |
| EP | 07758941.4 | 5/2015 |
| JP | 2005-292865 | 10/2005 |
| JP | 2009-501704 | 7/2011 |
| JP | 2009-501704 | 4/2012 |
| WO | WO 99/09480 | 2/1999 |
| WO | WO 99/12098 | 3/1999 |
| WO | WO 02/37689 | 5/2002 |
| WO | WO 2006/017584 | 2/2006 |
| WO | PCT/US07/064440 | 2/2008 |
| WO | PCT/US07/068661 | 8/2008 |

OTHER PUBLICATIONS

Kaczmarski et al., "Beyond backup toward storage management", IBM Systems Journal, vol. 42, No. 2, pp. 322-337, 2003, IBM.*
Rahumed et al., "A Secure Cloud Backup System with Assured Deletion and Version Control", 2011 International Conference on Parallel Processing Workshops, pp. 160-167, 2011, IEEE.*
U.S. Appl. No. 11/968,040, filed Dec. 31, 2007, Jedidiah Yueh.
U.S. Appl. No. 11/739,311, filed Apr. 24, 2007, Jedidiah Yueh.
U.S. Appl. No. 11/746,399, filed May 7, 2007, Jedidiah Yueh et al.
U.S. Appl. No. 11/772,183, filed Jun. 30, 2007, Jedidiah Yueh.
U.S. Appl. No. 11/688,203, mailed Sep. 10, 2009, Office Action.
U.S. Appl. No. 11/968,040, mailed Sep. 17, 2009, Office Action.
U.S. Appl. No. 11/739,311, mailed Sep. 21, 2009, Office Action.
U.S. Appl. No. 11/746,399, mailed May 14, 2009, Office Action.
U.S. Appl. No. 11/772,183, mailed Sep. 15, 2009, Office Action.
U.S. Appl. No. 11/688,203, filed Mar. 19, 2007, Jedidiah Yueh.
U.S. Appl. No. 12/762,769, filed Apr. 19, 2010, Jedidiah Yueh.
U.S. Appl. No. 11/688,203, mailed Mar. 3, 2010, Notice of Allowance.
U.S. Appl. No. 11/688,203, Mar. 24, 2010, Notice of Allowance.
U.S. Appl. No. 11/968,040, Mar. 9, 2010, Final Office Action.
U.S. Appl. No. 11/739,311, Mar. 1, 2010, Final Office Action.
U.S. Appl. No. 11/746,399, Dec. 14, 2009, Final Office Action.
U.S. Appl. No. 11/772,183, Feb. 24, 2010, Final Office Action.
U.S. Appl. No. 12/762,769, Jun. 23, 2010, Office Action.
U.S. Appl. No. 11/739,311, mailed Nov. 29, 2010, Final Office Action.
U.S. Appl. No. 11/746,399, mailed Jan. 19, 2011, Final Office Action.
U.S. Appl. No. 11/772,183, mailed Dec. 23, 2010, Final Office Action.
U.S. Appl. No. 11/968,040, mailed Sep. 3, 2010, Notice of Allowance.
U.S. Appl. No. 11/739,311, mailed Jul. 27, 2010, Office Action.
U.S. Appl. No. 11/746,399, mailed Aug. 5, 2010, Office Action.
U.S. Appl. No. 11/772,183, mailed Jul. 27, 2010, Office Action.
U.S. Appl. No. 12/762,769, mailed Oct. 26, 2010, Final Office Action.
Tooru Miyahara, the latest emulator guide by Vmware&QEMU, SoftwareDesign, book, Gijutsu-Hyohron Co. Ltd., Jul. 18, 2005, pp. 132-141.
U.S. Appl. No. 11/739,311, Sep. 13, 2011, Final Office Action.
U.S. Appl. No. 11/772,183, mailed Dec. 1, 2011, Final Office Action.
U.S. Appl. No. 11/739,311, mailed Mar. 16, 2011, Office Action.
U.S. Appl. No. 11/746,399, mailed Jul. 7, 2011, Notice of Allowance
U.S. Appl. No. 11/772,183, mailed Jun. 2, 2011, Office Action.
U.S. Appl. No. 12/762,769, mailed Apr. 15, 2011, Notice of Allowance.
Extended European Search Report dated Aug. 7, 2013 from European Patent Application No. 07762088.
Office Action dated Sep. 5, 2013 from U.S. Appl. No. 11/772,183 filed Jun. 30, 2007.
Office Action dated May 6, 2013 from U.S. Appl. No. 11/772,183 filed Jun. 30, 2007.
Office Action dated Mar. 5, 2014 in CN 200780009902.x.
U.S. Appl. No. 11/739,311, Jan. 6, 2014, Final Office Action.
U.S. Appl. No. 11/772,183, Feb. 4, 2014, Office Action.
U.S. Appl. No. 11/739,311, Sep. 3, 2014, Office Action.
U.S. Appl. No. 11/747,567, May 28, 2014, Final Office Action.

* cited by examiner

VIEW GENERATOR FOR MANAGING DATA STORAGE

CROSS-REFERENCE TO RELATED APPLICATIONS

The present application claims the benefit of U.S. Provisional Application Ser. No. 60/747,040, filed May 11, 2006 and entitled VIEW GENERATOR FOR MANAGING DATA STORAGE, which application is incorporated herein by reference in its entirety.

BACKGROUND OF THE INVENTION

1. The Field of the Invention

The present invention relates, in general, to data storage and backup solutions for archiving data and recovering data, and, more particularly, to software, hardware, systems, and methods for providing users with point-in-time or user-defined views of stored data or backups.

2. The Relevant Technology

The need for reliable backup and archiving of information is well known. Businesses are devoting large amounts of time and money toward information system (IS) resources that are devoted to providing backup and archive of information resident in computers and servers within their organizations that produce and rely upon digital information. For example, a number of backup solutions have been developed that allow businesses and other entities to efficiently manage their data storage by providing backups of client files in a cost-effective manner and often with large reductions in the size of the backups (e.g., a 90 percent reduction in data volume or the like can be achieved when only one version of a data object or data set/subset is stored along with changes to those objects and data sets).

Typically, these backup storages provide a consolidated store of enterprise information and may utilize high efficiency storage applications such as content addressed storage (CAS) and other techniques to reduce the amount of data stored in the backup or stored data files. Generally, CAS applications involve a storage technique for content that is in its final form, i.e., fixed content, or that is not changed frequently. CAS assigns an identifier to the data so that it can be accessed no matter where it is located. For example, a hash value may be assigned to each portion or subset of a data set that is to be data protected or backed up. Presently, CAS applications are provided in distributed or networked storage systems designed for CAS, and storage applications use CAS programming interface (API) or the like to store and locate CAS-based files in the distributed system or network.

The use of CAS and other high efficiency storage applications enables data protection systems to store online multi-year archives of backup data by removing storage of redundant data because complete copies of data sets do not have to be stored as long as the content is stored and available somewhere in the system. CAS-based backup applications have also improved the usage network and data storage resources with better distribution of data throughout a multi-node data storage system. CAS-based backup applications are also desirable because multi-year or other large backup archives can be stored easily since only a single instance of any particular data object (i.e., content) is stored regardless of how many times the object or content is discovered with the data set being protected or backed up. With CAS, the storage address for any data element or content is generated by an analysis of the contents of the data set itself. Since an exclusive storage address is generated for each unique data element (which is matched with a unique identifier) and the storage address points to the location for the data element, CAS-based architectures have found favor in the storage industry because they reduce the volume of data stored as each unique data object is stored only once within the data storage system.

The available high efficiency storage applications typically are provided on one or more servers at or linked with enterprise or client computer systems and interoperate with external archive systems (such as tape solutions or systems). The high efficiency storage applications are effective at storing data files, e.g., by storing numerous subsets or atomics of the data in a file, and allowing ready retrieval for recovery, restore, or access on demand. The backups or stored data files are accessible because the high efficiency storage applications generate and maintain directories and/or maps to the stored files and their atomics, data subsets, or data objects. Such directories also often include metadata pertaining to each of the backups.

While many of the existing backup solutions provide high efficiency data storage, there are growing demands that the backups be more readily manageable and accessible. In other words, backup users want to be able to leverage their backups to provide value beyond simply the costs associated with data protection and data retention requirements.

BRIEF DESCRIPTION OF THE DRAWINGS

To further clarify the advantages and features of the present invention, a more particular description of the invention will be rendered by reference to specific embodiments thereof which are illustrated in the appended drawings. It is appreciated that these drawings depict only typical embodiments of the invention and are therefore not to be considered limiting of its scope. The invention will be described and explained with additional specificity and detail through the use of the accompanying drawings in which.

DETAILED DESCRIPTION OF THE PREFERRED EMBODIMENTS

The present invention is directed to a method and system for generating views, such as point-in-time views, of files in an archival data storage system (e.g., views of backup files or "backups"). Briefly, the invention involves taking backups or archives of data sets across multiple computer systems for one or more clients or users. From these backups, virtual views are built based on a set of default or user-defined/modified criteria or rules, and these criteria or defining rules may be labeled a "view definition file." The virtual views or backup views are generated based on the view definition file and are stored or mounted as backup view directories or backup view file systems. The backup views can be smaller or larger in size than any particular original client backup. The backup views are generally built from the view definition file by retrieving or accessing attributes in the metadata previously created and stored by a data storage application (e.g., a high efficiency storage application). The metadata attributes may include information specified in the view definition file and may include information pertaining to user identifiers, date ranges, file types, file sizes, metadata tags, and the like. The generated backup view can be exported, such as to a client computer or machine, for processing. For example, the exported backup view may be processed by a search application or another view processing application.

To practice the invention, the computer and network devices may be any devices useful for providing the described functions, including well-known data processing and storage and communication devices and systems such as computer devices typically used as hosts in user or client computer systems with processing, memory, and input/output components, and server devices configured to maintain and then transmit digital data over a communications network. Data typically is communicated in digital format following standard communication and transfer protocols. The data storage resources, such as archive devices, are generally described as disk, optical, and tape devices that implement RAID and other storage techniques and that may use SCSI and other I/O, data transfer, and storage protocols, but the invention is not intended to be limited to the example embodiments or to specific hardware and storage mechanisms as it is useful for nearly any data storage arrangement in which archives of digital data, such as data volumes, are generated and maintained and for which it is desired to obtain virtual and/or point-in-time views of subsets of such stored or archived data to leverage the backups by facilitating searching and other data storage managing tasks.

Figure 1:
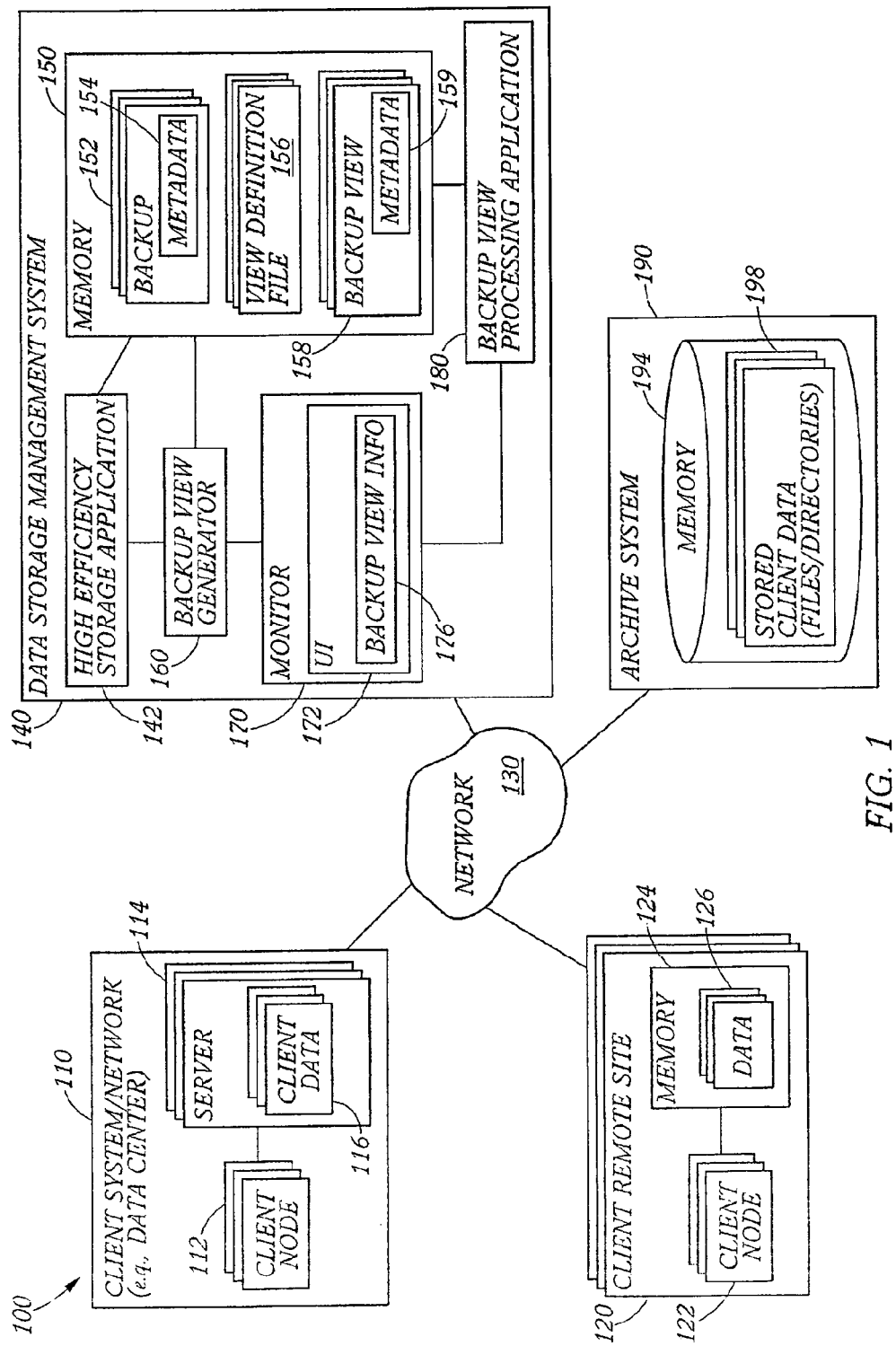
FIG. 1 illustrates a data storage system according to an embodiment of the invention, the system including components for generating backup views from stored content or previously generated backups.

FIG. 1 illustrates a data storage (or data protection) system 100 according to the present invention. The system 100 is shown in simplified or example form and is intended to represent a distributed network of computer systems/devices that generate digital data that is protected with copies stored in an archive or backup file system (such as a disk, tape, or other archival solution). The backup or data protection is managed by a data storage management system 140 that may be provided remotely as shown and/or be provided all or in part as part of a client system (e.g., the client systems 110, 120 may include an instance of a storage application and/or a backup view generator of the invention).

As shown, the system 100 includes a client system or network 110 such as a data center that includes a plurality of client nodes 112 such as desktops, laptops, or the like that are networked to one or more servers (or other memory devices) 114. Data 116 generated by or accessed by the client nodes 112 can be stored on the servers 114 to allow ready access. Additionally, the client may operate one or more remote sites 120 that are linked to the client system 110 via communications network 130 (e.g., a LAN, a WAN, the Internet, or other wired and/or wireless digital communications network). The remote sites 120 may include one or more client nodes 122 (such as desktops, laptops, mobile devices, or the like) with memory 124 for at least temporarily storing data 126 (which may be periodically transferred to server 114 or directly transferred to archive system 190).

The data 116 and/or 126 is managed for data protection by a data storage management system 140. Generally, such data protection involves a high efficiency storage application 142 storing copies 198 of the client data 116, 126 in memory 194. The memory 194 may take many forms such as disk storage, holographic systems, tape storage, other memory mechanisms, and combinations of such mechanisms that are useful for archiving large amounts of digital information. In one embodiment, the storage application 142 is a high efficiency application that controls the size of the stored client data 198 such as by storing limited copies of data objects or atomics and/or changes to stored content. For example, the application 142 may be a Content Addressed Storage (CAS) application.

As shown, the storage application 142 is adapted to produce backups 152 that are stored in memory 150 and that in a CAS implementation define a backup or archive file by providing identifiers for each data object in the backup 152 and its address in memory 194. In some embodiments, the backups 152 are client files and/or directories and are not simply chunks of data. In this regard, the storage application associates with each of these backups 152 a set of metadata 154, and the metadata attributes may include user identification, date information, file type, file size, metadata tags, and other information that identifies and defines the data 198 that makes up the backup 152.

The management system 140 further includes a backup view generator 160 that is operable by itself to generate backup views 158 with a set of metadata 159. Optionally, the backup view generator 160 may interoperate with the storage application 142 to generate backup views 158 with metadata 159. Briefly, each backup view 158 is generated by applying a view definition file 156 to the metadata 154 of the backups 152, which is explained in detail below and with reference to FIG. 2. Once the backup view 158 is created, it or a portion of the view 158 can be searched or otherwise processed by a backup view processing application 180 and can be viewed on a monitor 170 (e.g., as shown at 176 in user interface 172). For example, backup view 158 may be exported and then its metadata 159 may be processed to locate specific information or files with a searching application 180 (or on a remote device linked to network 130 or at client systems or sites 110, 120).

During operation of the system 100, the backup view generator 160 implements the concept of being able to synthesize new backups or backup views 158 from already existing content (i.e., stored client data 198 and backups 152 with the associated metadata 154). The basic idea is that the management system 140 is configured to leverage the fact that the storage application 142 natively stores files and directories (not just data blobs). Therefore, the backup view generator 160 can fabricate new views 158 of the existing data. The resulting backup view 158 from a backup view generation operation (such as process 200 of FIG. 2) may have a configuration similar to backup 152 (e.g., the generator 160 may use processes of storage application 142 to create the backup view 158 after the definition file 156 is generated). The backup view 158 may be assigned its own access rules (e.g., the backup view 158 may exist in a domain that may have different access rules than the original data). Further, in some embodiments, the backup view 158 may have its own retention policy, which may be independent from the retention settings of the originating backup 152. Because the backup view generator 160 can leverage processes of a storage application useful in creating backups 152, the overhead associated with adding the backup view generator 160 to management system 140 is relatively small and typically requires no changes to the hardware running the management system 140 (e.g., no server changes).

Figure 2:
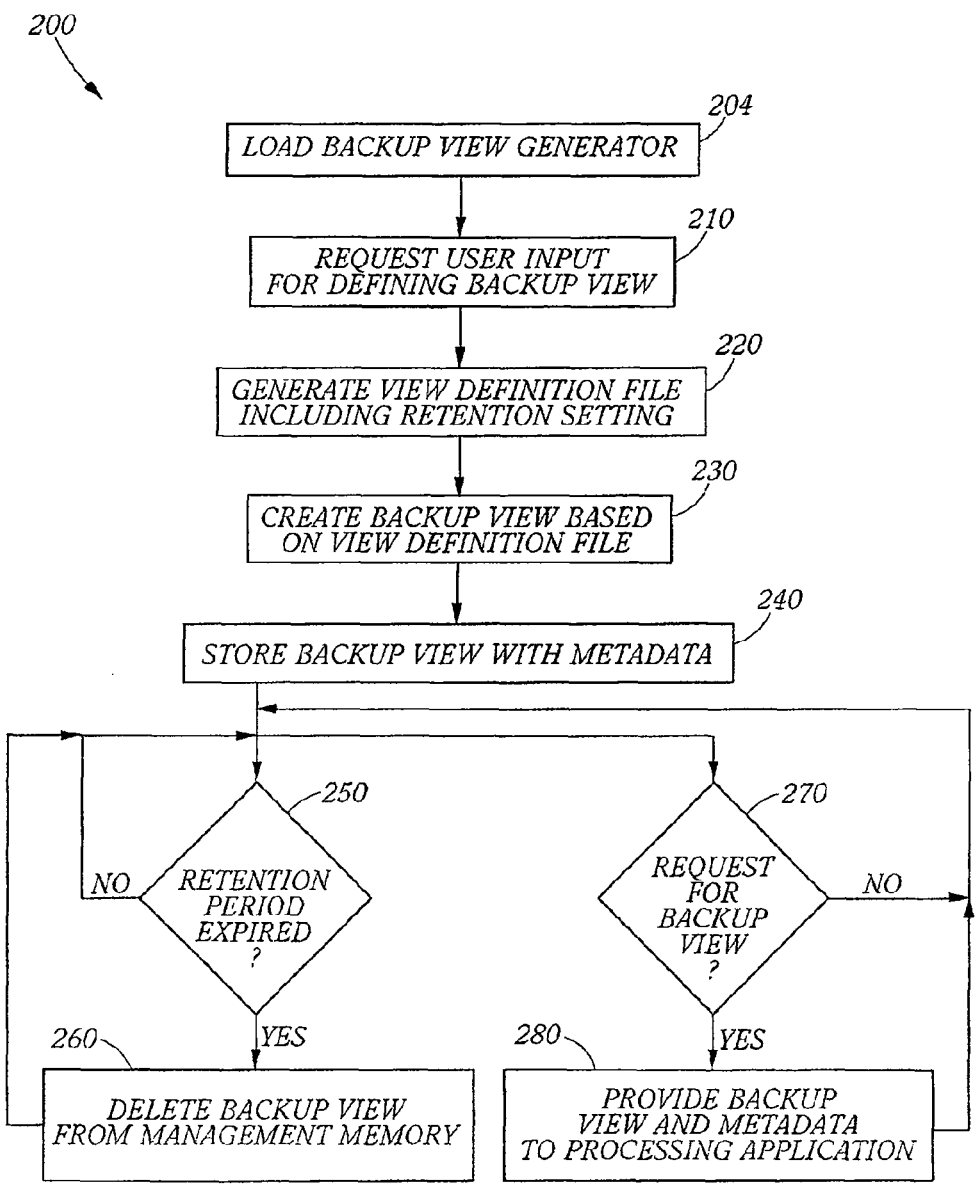
FIG. 2 illustrates an example backup view generation process that may be performed during operation of the system of FIG. 1.

FIG. 2 illustrates a backup view or point-in-time view generation process 200 of the present invention (such as may be performed by operation of the system 100 of FIG. 1). The method 200 begins with loading 204 a backup view generator, such as generator 160. This may involve providing the software or creating an instance of such an application on the same system as is running a data storage application (such as high efficiency storage application 142) or providing a communication link to such a data storage application. The backup view generator 160 is accessed by a user or is operated to request 210 user input for defining a backup view 158 (such as via a GUI or the like). The user input may include retention settings, an identifier for the backup view (such as an account number or the like), and a listing of files and/or directories to be included in a new backup view 158. In some cases, the listing of files and/or directories (or client data from archives) is defined by a user by providing values for one or more attributes of the metadata associated with previously created backups (e.g., attribute values for metadata 154 associated with backups 152).

The method 200 continues with the backup view generator 160 generating 220 a view definition file (such as file 156) based on the user input. The generator 160 creates 230 a backup view based on the view definition file (e.g., creates backup view 158 using file 156). For example, the generator 160 may provide the view definition file 156 to high efficiency storage application 142 as a request for a backup generation based on the view definition file 156, which results in creation of the backup view 158 with metadata 159. The backup view with its metadata is stored 240 in memory (such as memory 150) to be kept for a particular retention period.

In one embodiment, the view definition file 156 created at 220 is an extensible markup language ("XML") file. This XML file is provided to the storage application 142 as input for generation of a backup with a listing of the already existing files and directories managed by the management system 140 that should be included in the new backup or backup view. The information provided in the XML file or view definition file includes an account or file identifier that identifies the user, client, or the like to be associated with the backup view. The view definition file typically also includes a retention setting or period value that is to be assigned to the backup view. The view definition file further defines the data in stored or archived client data 198 to be included in the new backup view 158, such as by defining files and/or directories for inclusion in the new backup view. This may be provided with a list of files and directories in which each entry specifies a source backup 152 (such as by account or other identifier) and, in some cases, the full path to the file or directory. Optionally, the view definition file 156 may include a new path for where the backup view file 158 should be created.

An example view definition file 156 that yields a new backup view 158, e.g., under the SEARCHES account and containing three files, may take on the following form:

<view saveacnt="SEARCHES" expires="7" >
<file acnt="/clients/calcium" labelnum="5"
fullname="E:/Documents and Settings/ Administrator/ Application
Data/Microsoft/Internet Explorer/brndlog.txt" />
<file acnt="/clients/calcium" labelnum="7"
fullname="C:/JBuilder4/tomcat/lib/test/Golden/welcome.txt" />
<file acnt="/clients/cerium.avamar.com" labelnum="2"
fullname="C:/TEMP/report.txt" />
</view>

The backup view generator 160 may utilize a variety of applications or subroutines to create the XML or other format view definition file 156, which can then be used to create the backup view 158 such as by feeding it to a process of the storage application 142.

Returning to FIG. 2, the method 200 continues with determining 250 whether the retention period has expired for each backup view and if yes, then deleting 260 the backup view from the management system 140. In parallel, the method 200 includes determining 270 whether a request for the backup view 158 is received. If so, then the method 200 continues with the backup view 158 and its metadata 159 being provided 280 to a processing application for further processing (such as to UI 172 for viewing its information 176 or to backup view processing application 180 for processing, which may include searching or the like).

Implementation of a data storage system 100 and the method 200 may be used to leverage the backups 152 and stored client data 198 by providing new storage management functionality or uses of the backup views 158 and its metadata 159. For example, a data storage administrator or client may want to collect a list of "interesting" files for short-term purposes. To facilitate a metadata search of such files, the user can generate view definition files 156 that define "interesting" and sets a short retention period such as less than 7 days or some other relatively short time frame. A file may be determined as interesting based on a client's business rules and processes or using third-party or specially-developed tools. For example, all files related to a specific user, client, account or having a particular type may be kept for short term purposes as being of particular interest. Then, one or more backup views may be created to allow processing (e.g., metadata searches) of these unique backup views 158. For example, the files provided in or associated with the backup view 158 may be used for full text search or tape out.

In other cases, a client or administrator may wish to put "interesting" files aside for long-term purposes. In this case, the view definition file 156 would include long retention settings rather than short ones to generate and keep within the management system 140 backup views 158 for other purposes beyond backup and restore. In this regard, "long" retention settings are likely any retention periods that are longer than the default retention settings, and a process may be provided that identifies backups 152 that are "important" to a client or for system administration, and a view definition file 156 that sets aside these identified backups as backup views 158 may be generated by the process or by the backup view generator. In some cases, this process may peruse backups 152 and their metadata 154 to identify important files and/or directories, and the backup view generator 160 or a separate process may be configured to periodically gather these files into a new account by creating a view definition file 156 with a longer retention (e.g., 7 years or some other time frame that is relatively long compared to common default retention periods) and that lists each of these files (or otherwise indicates the files/directories for inclusion in a backup view) and initiate generation of a backup view based on this view definition. In this implementation, the originating backups 152 may expire automatically in 14, 30 or 90 days, or some other short period of time, while the special interest documents, files, and/or directories would be retained for a user-defined length of time.

The backup view generation process of the invention also allows clients and system administrators to regularly rearrange backup data to simplify access. For example, "metadata activities" could be scheduled for periodic completion, e.g., manual initiation or automated by the backup view generator or other module. For example, it may be useful to periodically gather one or more individual user's files for a client and place these into logical locations ("Jim Olson's Files," "Martha Chu's Files", and the like). This allows the files or data to be readily restored at any time, and this sort of "presorting" for a restore or recovery process could be scheduled to be performed periodically (e.g., once a day, once a week, etc.). In this case, a set of view definition files may be created and stored that provide a metadata attribute of user identification having a value that identifies each user of interest. Then, periodically, the backup view generator 160 may apply the definition files to the backups to find files with matching user identification attributes to be used in creating backup views.

The backup view generation technique may also be used for logically grouping data after backups 152 have been created. In some situations, having individual machine-level or client backups 152 makes little sense. Although the backups are typically created from file systems and databases by the storage application, the logical system spans multiple clients and/or includes specific portions (e.g., databases, directories, files, and the like) of clients. A single application may span different physical systems with multiple databases, web servers, scripts, and programs all running as one logical system. As a result, it may make little sense to restore one physical system without restoring all the interrelated components. Restoring such distributed and/or complex environments is complicated because the backups are often managed by physical systems (e.g., by machine, by file system, by database, and so on) rather than by logical function or relationship.

To address this situation and facilitate restore and provide more effective data protection, the backup view generation method may be used after all the component machines, databases, and the like for a particular logical function have been backed up by a storage application. Then, a view definition file can be created (or provided if already generated) that defines all files and/or directories (or client data) associated with the logical function by defining one or more particular metadata attributes in the metadata associated with the backups. A backup view is then created using the view definition file to search the backups for the relevant content. In this manner, the method and system of the invention can be used to group these related data objects into a more logical structure, which will be more likely to make sense to a process or operator restoring the data associated with the logical function (e.g., all data associated with an application, with a portion of a client's business, or the like).

Embodiments included general-purpose and/or special-purpose devices or systems that include both hardware and/or software components.

Embodiments may also include physical computer-readable media and/or intangible computer-readable media for carrying or having computer-executable instructions, data structures, and/or data signals stored thereon. Such physical computer-readable media and/or intangible computer-readable media can be any available media that can be accessed by a general purpose or special purpose computer. By way of example, and not limitation, such physical computer-readable media can include RAM, ROM, EEPROM, CD-ROM or other optical disk storage, magnetic disk storage or other magnetic storage devices, other semiconductor storage media, or any other physical medium which can be used to store desired data in the form of computer-executable instructions, data structures and/or data signals, and which can be accessed by a general purpose or special purpose computer. Within a general purpose or special purpose computer, intangible computer-readable media can include electromagnetic means for conveying a data signal from one part of the computer to another, such as through circuitry residing in the computer.

When information is transferred or provided over a network or another communications connection (either hardwired, wireless, or a combination of hardwired or wireless) to a computer, hardwired devices for sending and receiving computer-executable instructions, data structures, and/or data signals (e.g., wires, cables, optical fibers, electronic circuitry, chemical, and the like) should properly be viewed as physical computer-readable mediums while wireless carriers or wireless mediums for sending and/or receiving computer-executable instructions, data structures, and/or data signals (e.g., radio communications, satellite communications, infrared communications, and the like) should properly be viewed as intangible computer-readable mediums. Combinations of the above should also be included within the scope of computer-readable media.

Computer-executable instructions include, for example, instructions, data, and/or data signals which cause a general purpose computer, special purpose computer, or special purpose processing device to perform a certain function or group of functions. Although not required, aspects of the invention have been described herein in the general context of computer-executable instructions, such as program modules, being executed by computers, in network environments and/or non-network environments. Generally, program modules include routines, programs, objects, components, and content structures that perform particular tasks or implement particular abstract content types. Computer-executable instructions, associated content structures, and program modules represent examples of program code for executing aspects of the methods disclosed herein.

Embodiments may also include computer program products for use in a system. The computer program product may comprise a physical computer-readable medium having computer readable program code stored thereon, the computer readable program code comprising computer executable instructions that, when executed by a processor, cause the system to perform the methods disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method for generating different views of archived data or backups, comprising:
repeatedly producing backups of data in a client system, wherein the backups are stored in a data storage management system in a memory separately from the data which is stored by a server in the client system, wherein the backups are natively stored as files and directories, wherein a set of metadata attributes is associated with the backups, the files and directories of the backups being stored according to a first retention policy, wherein the backups correspond to different points in time and wherein new backups are added to the backups over time;
receiving user input specifying one or more user-defined criteria for determining which files or directories included in the backups are to be part of a backup view, such that those files or directories that meet the user-defined criteria are determined to be part of the backup view;
generating a view definition file that includes the files or directories that are determined to be part of the backup view according to the user-defined criteria, the view definition file including metadata values corresponding to the user-defined criteria, wherein the view definition file is configured to serve as a basis for generating the backup view;

generating the backup view from the backups by:
  applying the view definition file to the backups to compare the metadata values of the view definition file to the set of metadata attributes associated with the backups and
  searching the backups to identify files in the backups that satisfy the user-defined criteria used to generate the view definition file,
  wherein one or more files resulting from the search are associated with the backup view, and wherein the one or more files associated with the backup view is the portion of the data included in the backups that satisfies the user-defined criteria included in the view definition file;

storing the generated backup view and corresponding metadata for an associated retention period in the memory of the data storage management system, wherein the specified files or directories in the generated backup view are stored according to a second retention policy that is different than the first retention policy used for the backups;

receiving a request for the backup view for processing, wherein processing the requested backup view includes processing data in the backup to identify and display the one or more files that are included in the backup view;

periodically applying the view definition file to the backups after the view definition file has been created such that the same backup view is updated to include files or directories that were backed up after the view definition file was generated in addition to the files and directories that were backed up before the view definition file was generated; and exporting the backup view to a client device such that the files and directories included in the backup view are searchable.

2. The method of claim 1, wherein the backups and the associated metadata attributes are generated by a high efficiency storage application.

3. The method of claim 1, wherein the data in the backups are logically related to each other, but comprise portions of backups of a plurality of different physical systems.

4. The method of claim 1, wherein generating a view definition file comprises receiving the user input including one or more of the metadata values.

5. The method of claim 1, wherein the view definition file includes a setting for a retention period that defines a period of time for retaining the backup view generated from the view definition file and wherein the backup view includes files from different backups.

6. The method of claim 1, further comprising generating a backup based on the view definition file, wherein the generated backup includes the one or more files.

7. The method of claim 1, wherein the view definition file is usable as a basis for generating both the backups and the backup view.

8. In a data protection system that stores backups of data of a system, there being a set of metadata attributes associated with each of the backups, a method for generating different views of the backups, the method comprising:
  requesting user input for defining a first backup view of the backups and defining a second backup view of the backups, the user input including metadata values, the backups being stored according to at least a first retention policy, the backups stored separately from the data, wherein new backups are included with the backups over time;

receiving user input specifying one or more user-defined criteria for determining which files or directories are to be part of the first backup view, such that those files or directories that meet the user-defined criteria are determined to be part of the first backup view;

in response to receiving the user-defined criteria, generating a first view definition file that includes those one or more files or directories that are determined to be part of the first backup view according to the user-defined criteria, the view definition file being configured to generate the first backup view of files and directories included in the backups, and generating a second view definition file that is configured to generate a second backup view of the files and directories included in the backups, wherein the first backup view and the second backup view are generated from the same backups and include different files;

generating the first backup view from the backups by applying the first view definition file to the backups to compare the metadata values included in the first view definition file to the set of metadata attributes associated with the backups and searching the backups in order to identify one or more files from the files and directories included in the backups to include in the first backup view, wherein the first backup view provides a view of one or more files in the backups whose metadata attributes match the metadata values contained in the first view definition file, and wherein the one or more files of the backups included in the first backup view are configured for processing and viewing by a backup view processing application;

generating the second backup view from the backups by applying the second view definition file to the backups to compare the metadata values included in the second view definition file to the set of metadata attributes associated with the backups and searching the backups in order to identify one or more files from the backups to include in the second backup view, wherein the second backup view provides a view of one or more files in the backups whose metadata attributes match the metadata values contained in the second view definition file, and wherein the one or more files of the backups included in the second backup view are configured for processing and viewing by a backup view processing application;

storing the first backup view and the second backup view in a memory, wherein the specified files or directories in at least the first backup view are stored according to a second retention policy that is different than the first retention policy used for the backups; and receiving a request for the first backup view, wherein processing the first backup view includes processing the files and directories in the backups to identify the one or more files stored in the memory of the data protection system and associated with the first backup view, periodically updating the first backup view and the second view by applying the first and second view definition files to the backups including the new backups such that the first backup view and the second backup view include files from backups that are created after the generation of the first and second view definition files;

wherein the first backup view and the second backup view are configured to rearrange the backups according to a logical function such that the first and second backup views correspond to a rearranged backup to simplify access to the data included in the backups, wherein the logical function relates the data in the first and second backup views in a logical structure.

9. The method of claim 8, wherein the user input includes one or more of:
a setting for a retention period that defines a period of time for retaining the generated backup view;
an identifier for the generated backup view;
a listing of files, directories or both to be included in the generated backup view;
a user identifier;
a date range;
a file type; or
a file size.

10. The method of claim 8, wherein generating first the backup view comprises providing the first view definition file to a storage application and the storage application generating the first backup view based on the first view definition file.

11. The method of claim 8, further comprising storing the generated first backup view and metadata associated with the generated first backup view in memory.

12. The method of claim 11, further comprising determining that a retention period for the generated first backup view is expired and deleting the generated first backup view from memory.

13. The method of claim 11, further comprising receiving a request for the generated first backup view from a processing application and providing the generated first backup view and the metadata associated with the generated first backup view to the processing application for processing.

14. The method of claim 13, wherein the processing application processes the generated first backup view and metadata associated with the generated first backup view by one or more of displaying the generated first backup view in a user interface and searching the first generated backup view, wherein displaying the generated first backup view includes displaying the one or more files of the backups included in the first backup view.

15. A data storage management system communicably connected to one or more client systems and an archive storage system, wherein the data storage management system stores backups of the data of the one or more client systems and wherein the data of the one or more client systems is stored in a memory of the one or more client systems and made available to clients by servers, the data management system comprising:
a storage application for generating and storing archive data to the archive storage system, wherein the archive data includes a copy of client data generated by the client systems, the storage application also generating backups of the client data, wherein a set of metadata attributes is associated with each of the backups and wherein each of the backups is stored as files and directories in the data storage management system, the files and directories of the backups being stored according to a first retention policy, wherein the data storage management system is separate from the client systems;
a receiver for receiving user input specifying one or more user-defined criteria for determining which files or directories are to be part of a backup view, such that those files or directories that meet the user-defined criteria are determined to be part of the backup view;
a first backup view definition file including those one or more files or directories that are determined to be part of the backup view according to the user-defined criteria, the first backup view definition file including metadata values, the first backup view definition file defined from user input and configured to fabricate a first view of some of the files and directories included in backups according to the user input;
a second backup view definition file including metadata values, the second backup view definition file defined from user input and configured to fabricate a second view of some of the files and directories included in the backups, wherein the first view and the second view each include files identified from the files and directories included in the backups; and
a backup view generator that generates:
a first backup view of the backups by applying the first view definition file to the backups to compare the first backup view definition file to the set of metadata attributes associated with the backups so as to identify, as a result of the comparison, first files and directories from the backups to be associated with the first backup view, wherein the first backup view represents a portion of the backups and the first backup view identifies some of files and directories associated with one of the client systems and wherein the first backup view is configured to be exported and searched, wherein the files and directories associated with the first backup view is exported and searched, and wherein the backup view generator stores the first backup view and corresponding metadata for an associated retention period, wherein new backups are included with the backups over time;
a second backup view of the backups by applying the second view definition file to the backups to compare the second backup view definition file to the set of metadata attributes associated with the backups so as to identify, as a result of the comparison, second files and directories from the backups to be associated with the second backup view, wherein the second backup view represents a different portion of the backups than the first backup view and wherein the backup view generator stores the second backup view and corresponding metadata for an associated retention period;
wherein the backup view generator periodically updates the first backup view and the second view by applying the first and second view definition files to the backups including the new backups such that contents of the first and second backup view change each time the first and second view definition files are applied to the backups;
and
a memory, wherein the backups, the first and second view definition files and the first and second backup views are stored in the memory, wherein the specified files or directories in at least the first backup view are stored according to a second retention policy that is different than the first retention policy used for the backups.

16. The system of claim 15, wherein the storage application comprises a content addressed storage application.

17. The system of claim 15, further comprising a backup view processing application for processing backup views, wherein the backup view processing application processes the first backup view by searching the backup views for specific information or files.

18. The system of claim 15, further comprising presorting the first backup view and the second backup view in anticipation of a request for the first backup view or the second backup view.

19. The system of claim 15, wherein the first backup view definition file comprises metadata values, user-specified values, or both, and wherein the backup view generator is operable to synthesize, using a backup view definition file, new backups from existing content included in the client data.

20. A physical computer-readable media carrying computer-executable instructions that, when executed, carry out the processes recited in claim 1.

* * * * *